United States Patent [19]

Nagasaka

[11] Patent Number: 4,706,007
[45] Date of Patent: Nov. 10, 1987

[54] SURFACE PULSE MOTOR

[75] Inventor: Nagahiko Nagasaka, Iruma, Japan

[73] Assignee: Kabushiki Kaisha Yaskawa Denki Seisakusho, Fukuoka, Japan

[21] Appl. No.: 866,639

[22] Filed: May 27, 1986

[30] Foreign Application Priority Data

Jun. 25, 1985 [JP] Japan .................. 60-137018

[51] Int. Cl.$^4$ .......................................... G05B 11/00
[52] U.S. Cl. ...................... 318/687; 318/685; 318/135; 318/37; 318/38; 310/12
[58] Field of Search ............... 318/687, 685, 135, 37, 318/38, 115; 310/12

[56] References Cited

U.S. PATENT DOCUMENTS

| 3,376,578 | 4/1968 | Sawyer | 346/29 |
| 3,457,482 | 7/1969 | Sawyer | 318/38 |
| 4,535,278 | 8/1985 | Asakawa | 318/687 |
| 4,626,749 | 12/1986 | Asakawa | 318/135 |

Primary Examiner—William M. Shoop, Jr.
Assistant Examiner—Saul M. Bergmann
Attorney, Agent, or Firm—Beveridge, DeGrandi & Weilacher

[57] ABSTRACT

A surface pulse motor having a stator and a mover is provided such that the stator is made of a magnetic material of a planar configuration with a number of projections formed on a surface thereof at positions corresponding to the intersecting points of a first lattice. The mover is made of electromagnets of predetermined phases, each electromagnet having a number of projections formed on a surface thereof opposing the surface of the stator at a pitch equal to that of the first lattice. When a second lattice which is rotated relative to the first lattice by a predetermined angle is assumed, the electromagnets other than the first phase are displaced from that of the first phase by a distance corresponding to a fraction of the pitch of the first lattice in directions of the coordinate axes of the second lattice, respectively. The are further provided for supporting the mover such that an air gap is maintained between the stator and the mover, and that the electromagnets are movable in combination in the directions of the coordinate axes.

2 Claims, 7 Drawing Figures

SURFACE PULSE MOTOR

BACKGROUND OF THE INVENTION

This invention relates to an integral type surface pulse motor wherein phase electromagnets are arranged in two-dimensional manner instead of one dimensional manner.

Surface pulse motors have been widely used as X-Y stage drives for the production of semiconductor elements, for X-Y plotters and scanners in office automatic and peripheral apparatus, and as a principal component of an automatic drawing machine.

For instance, a surface pulse motor comprising linear pulse motors of a hybrid type of a variable reluctance type and arranged for X and Y axes are manufactured by Xinectics, Inc.

One example of the application is a device for controlling a relative movement along an axis extending between two members (Japanese Patent Publication No. 41602/1974), which utilizes four three-phase linear pulse motors of a variable reluctance type, two for the X axis and two for the Y axis. Another example is a device for controlling movement of an output member along a predetermined axis (Japanese Patent Publication No. 7962/1977) in which four hydrid type two phase linear pulse motors, two for the X axis and two for the Y axis are also used.

However, the surface pulse motors used in these examples are complicated and expensive as as in the case of an X-Y plotter made by Hewlett-Packard Co., so that up to now these motors have not been used widely.

SUMMARY OF THE INVENTION

The basic object of this invention is to provide a surface pulse motor wherein the above described difficulties of conventional pulse motors are overcome, and various apparatus such as X-Y stages and X-Y plotters can be reproduced by use of the pulse motor of the present invention.

According to the present invention, there is provided a surface pulse motor having a stator and a mover. The stator is made of a magnetic material of a planar configuration with a number of projections formed on a surface thereof at positions corresponding to intersecting points of a rectangular lattice. The mover is made of electromagnets of a densely wound type, each having a number of projections formed on a surface thereof in opposition to the surface of the stator at a pitch equal to that of the projections of the stator. When a rectangular coordinate lattice (X,Y), which is rotated relative to the rectangular lattice of the stator by an angle $\tan^{-1}(\frac{1}{2})$ is assumed, the second to fifth phases are displaced from that of the first phase by a distance corresponding to $1/\sqrt{5}$ pitch of the rectangular lattice of the stator in directions $+X$, $+Y$, $-X$ and $-Y$ of the assumed coordinate lattice, respectively. Means are provided for supporting the mover such that an air gap is maintained between the stator and the mover. The electromagnets are movable in combination in the X and Y directions.

According to another aspect of the present invention, there is provided a surface pulse motor having a stator and a mover. The stator is made of a magnetic material of a planar configuration with a number of projections formed on a surface thereof at positions corresponding to intersecting points of a triangular lattice and, the mover is made of seven phase electromagnets of concentrately wound type with each phase having a number of projections formed on a surface thereof in opposition to the surface of the stator at a pitch equal to that of the projections of the stator. When a triangular coordinate lattice (X, Y, Z) which is rotated relative to the triangular lattice of the stator by an angle $\tan^{-1}(\sqrt{3}/5)$ is assumed, the second to seventh phases are displaced from that of the first phase by a distance corresponding to $1/\sqrt{7}$ pitch of the triangular lattice of the stator in directions of $+X$, $+Y$, $+Z$, $-X$, $-Y$ and $-Z$ of the assumed coordinate lattice, respectively. Means are provided for supporting the mover such that an air gap is maintained between the stator and the mover. The electromagnets are movable in combination in the X, Y and Z directions.

DESCRIPTION OF THE PREFERRED EMBODIMENTS

The preferred embodiments of the invention will now be described with reference to the attached drawings.

Figure 1:
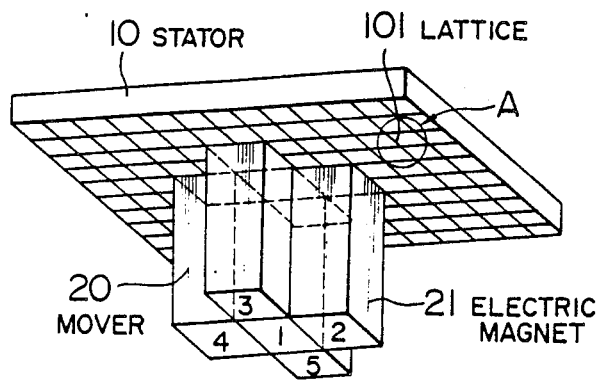
FIG. 1 is a perspective view showing a general construction of a preferred embodiment according to the present invention.
Figure 2:
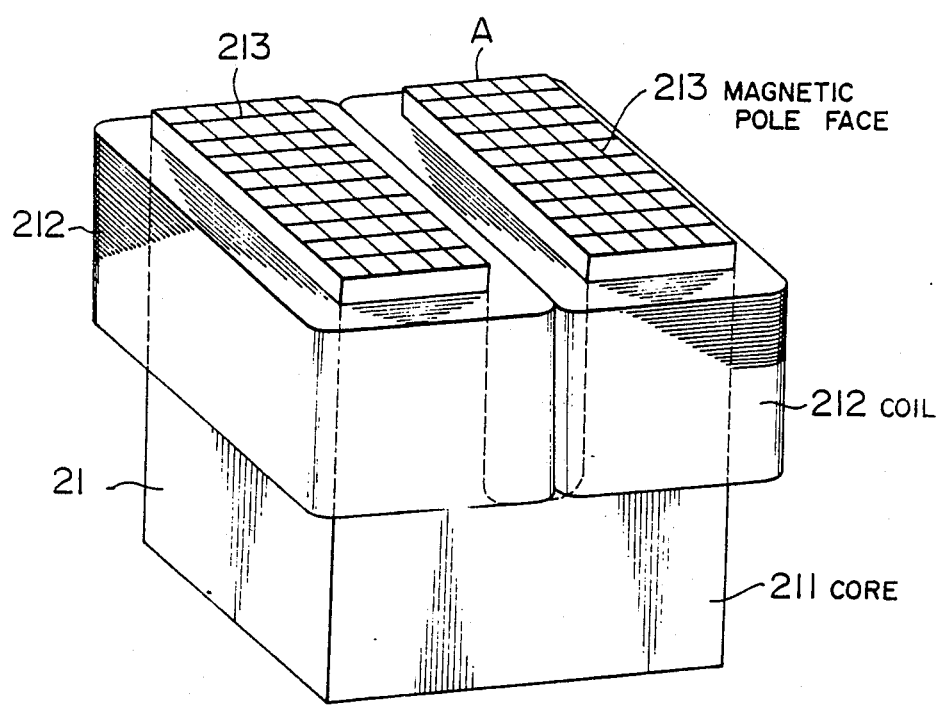
FIG. 2 is a perspective view showing an electromagnet constituting one part of a mover of the embodiment.
Figure 3:
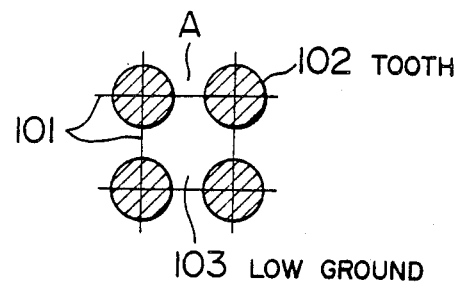
FIG. 3 is a plan view showing an arrangement of projections formed on a surface of a stator of the embodiment.

In the embodiment shown in FIGS. 1 through 4, the surface pulse motor comprises a stator 10 which is made of a magnetic material formed to have a planar configuration. A number of projections (or teeth) 102 are provided on the surface of the stator at positions corresponding to the intersecting points of a rectangular lattice 101 as shown in FIG. 3, with recessed area 103 surrounding the projections 102.

The pulse motor further comprises a mover 20 made of five phase electromagnets 21, each having a magnetic core 211 and a coil 212 densely wound around the magnetic core 211. A number of projections (or teeth) are formed on a surface 213 of the core 211 opposing to the stator 10 at a pitch equal to that of the projections of the stator 10. All five phase electromagnets 21 are held together and supported by a suitable supporting means (not shown) so that a small air gap is maintained between the stator 10 and the mover 20. When any of the electromagnets 21 are energized or excited, the projections on the surface 213 of an excited electromagnet 21 are attracted to the projections 102 of the stator 10 located adjacent to the projections of the mover 20.

Figure 4:
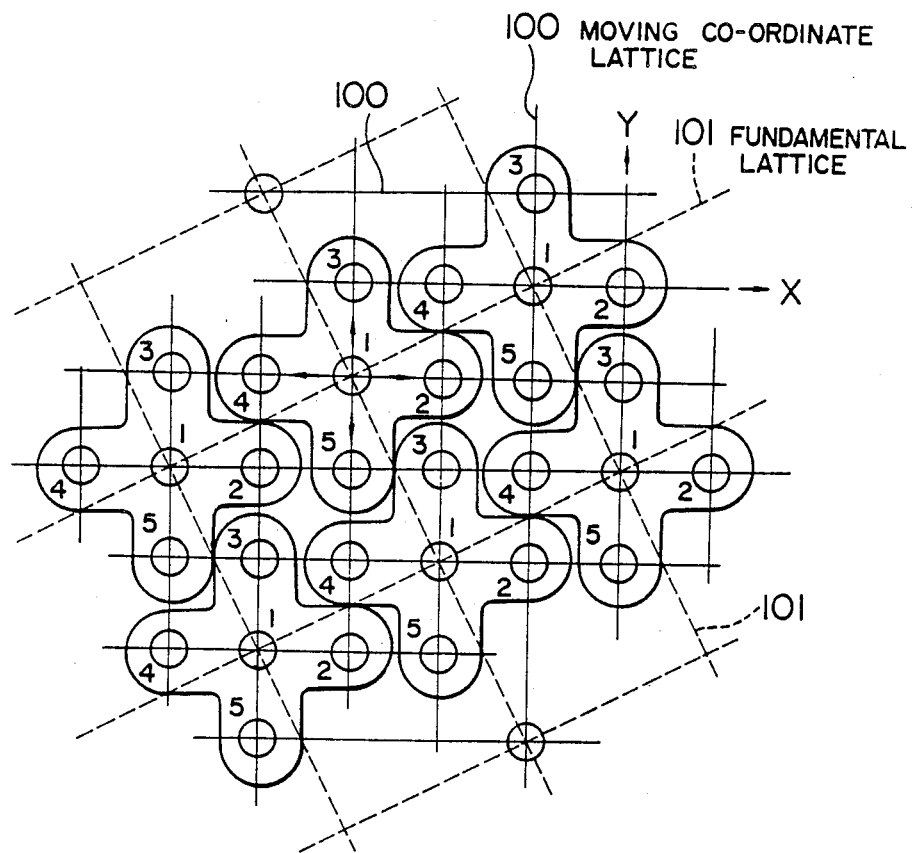
FIGS. 4 and 4a are diagrams for explaining the lattice-formed arrangement of the projections provided on the opposing surfaces of the stator and the mover.

The five phase electromagnets 21 of the mover 20 are arranged as shown in FIG. 4. That is, when a moving coordinate lattice 100 having rectangular coordinate axes X and Y, which is rotated by an angle $\tan^{-1}(\frac{1}{2}) = 26.565°$ from the fundamental lattice 101 is considered, and when the lattice pitch of the moving coordinate lattice 100 is assumed to be 1, the lattice pitch of the fundamental lattice 101 is expressed to be $\sqrt{2^2+1}=\sqrt{5}$ and the arrangement of the electromagnets 21 of the mover 20 is determined with respect to the moving coordinate lattice 100 such that the second through fifth phase electromagnets 21 are displaced from the first phase electromagnet by $1/\sqrt{5}$ of one pitch of the fundamental lattice 101 in the directions of $+X$, $+Y$, $-X$, and $-Y$ of the moving coordinate lattice 100, respectively.

The operation of the above described embodiment of the invention will now be described.

Figure 4A:
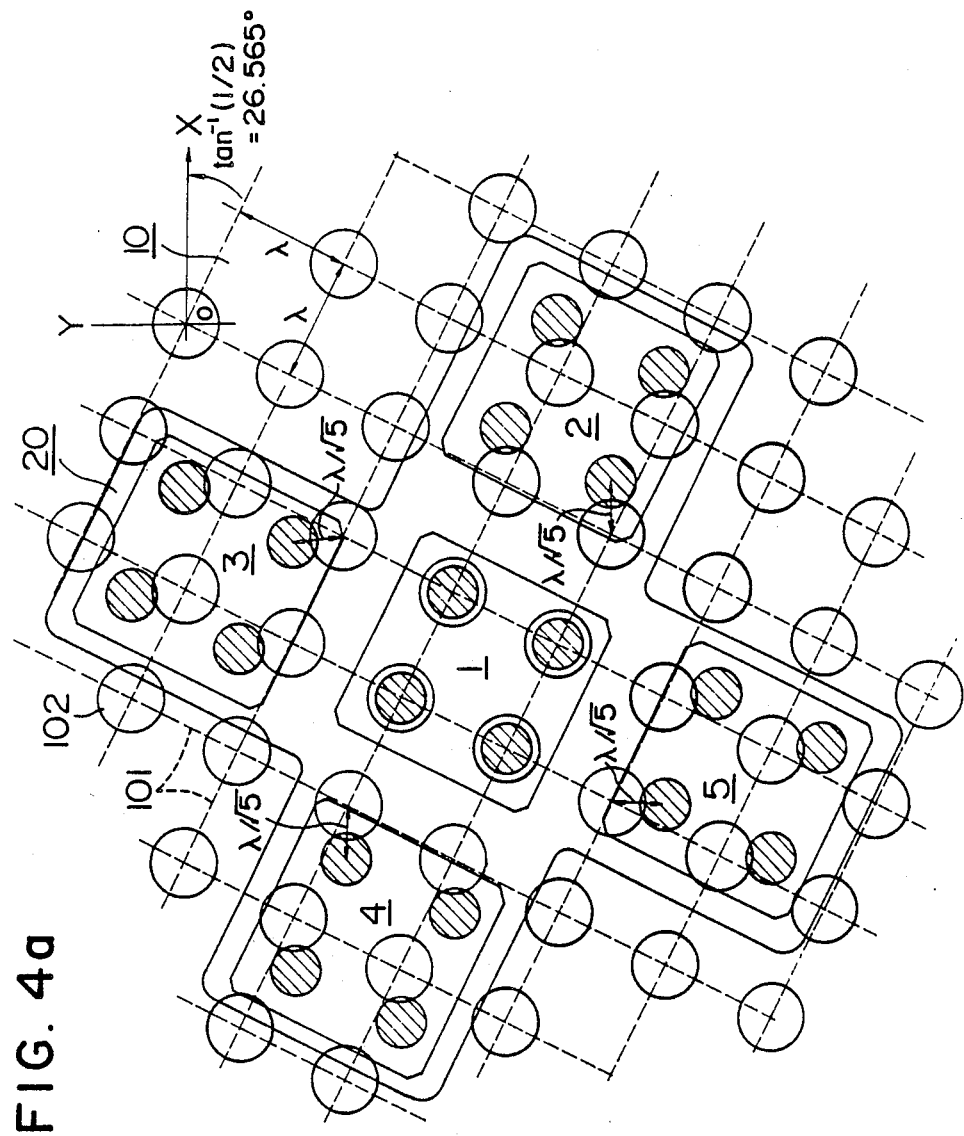

In a state shown in FIG. 4a, the projections of the first phase electromagnets 21 coincide with the projections 102 of the stator 10. When the second phase electromagnet 21 of the mover 20 is excited at this time, the mover 20 is shifted leftward in the direction of $-X$ by one step. Likewise, when the third to fifth phase electromagnets are excited, the mover 20 is shifted downward, rightward and upward, (i.e. in the directions of $-Y$, X and Y) respectively. Thus starting from the position of the first phase, the mover 20 can be moved in either one of the directions by one step. When the 5 phase electromagnets 21 are excited in the order of $1\to 2\to 5\to 3\to 4\to 1$, the mover 20 is shifted leftward in a successive manner. On the other hand, when the electromagnets 21 are excited in the order of $1\to 5\to 4\to 2\to 3\to 1$ phases, the mover 20 is shifted upward successively. It is apparent that the mover 20 may otherwise be shifted in any of oblique directions.

In FIG. 4a, the projections 102 of the stator 10 and the projections of the mover 20 are indicated by blank circles and hatched circles, respectively. It is assumed that the first phase electromagnet is now energized. Then if the energizing of the electromagnet is transferred from the first phase to the second phase, the mover 20 is shifted leftward by one step equal to $1/\sqrt{5}$ pitch of the lattice 101. Likewise when the energization is transferred from the first phase to the third phase electromagnet, the mover 20 is shifted downward.

Although in FIG. 4a the number of the projections on the surface 213 of each phase electromagnet 21 is selected to be 4, it is apparent that any other suitable number may otherwise be selected.

Figure 5:
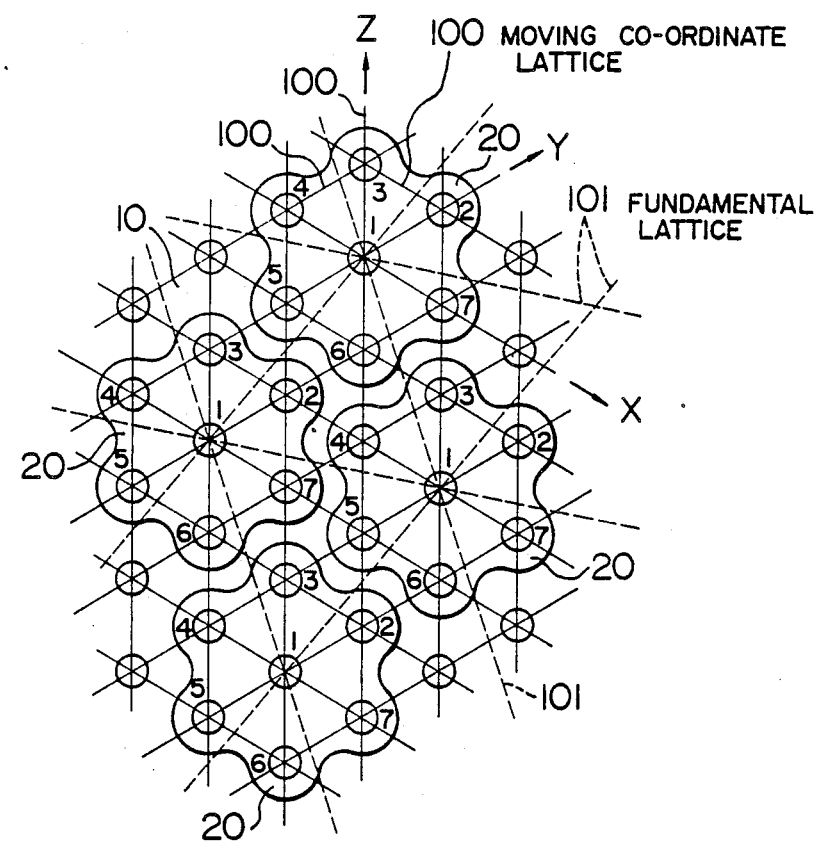
FIGS. 5 and 5a are diagrams for explaining the lattice-formed arrangement of the projections provided on the opposing surfaces of the stator and the mover of another embodiment of the present invention.
Figure 5A:
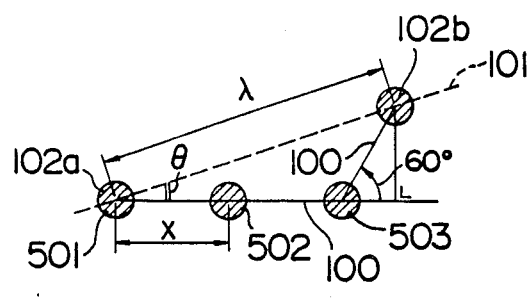

Another embodiment of the invention is illustrated in FIGS. 5 and 5a wherein similar members and lattices are designated by similar reference numerals.

According to this embodiment a seven phase variable reluctance surface pulse motor utilizes a triangular fundamental lattice 101. In this embodiment, when it is assumed that the pitch of the lattice 101 between two adjacent projections 102a and 102b of the stator 10 is represented by $\Lambda$, that a projection of the mover 20 is shifted step by step to $501\to 502\to 503$ upon application of a pulse signal, successively, and that the distance of one step is represented by x, the pitch $\Lambda$ can be expressed as:

$$\lambda = \sqrt{\left(\frac{5}{2}x\right)^2 + \left(\frac{\sqrt{3}}{2}x\right)^2} = \sqrt{7}x$$

and hence $x=\Lambda/\sqrt{7}=0.378\Lambda$. Furthermore, an angle $\theta$ representing the moving direction of the mover 20 relative to the fundamental lattice 101 of the stator 10 is expressed as:

$$\theta = \tan^{-1}(\sqrt{3}/5) = 19.1066°$$

Thus, in the seven phase surface pulse motor of this embodiment, when a triangular moving coordinate lattice (X, Y, Z) 100 rotated from the triangular fundamental lattice 101 by an angle of $\tan^1(\sqrt{3}/5)$ is considered, the electromagnet of the second phase is displaced from that of the first phase by a distance of $1/\sqrt{7}$ pitch of the fundamental triangular lattice in the direction of $+X(0°)$ while the third phase is displaced from that of the first phase by the same distance in the direction of $+Y(60°)$. Likewise, the fourth to seventh phase electromagnets are displaced from the first phase electromagnet by a distance of $1/\sqrt{7}$ pitch of the fundamental triangular lattice in the directions of $+Z(120°)$, $-X(180°)$, $-Y(240°)$ and $-Z(300°)$, respectively. As a consequence, when the energization of the seven phase electromagnets of this embodiment is transferred from the first phase to the second, third and so forth phases, the mover is shifted from the first phase energized position by one step in the directions of $-X$, $-Y$, $-Z$, $+X$, $+Y$ and $+Z$, respectively.

Although the invention has been described with respect to preferred embodiments thereof, it is apparent that various modifications or alterations may be carried out without departing from the scope of the present invention.

For instance, the electromagnets 21 and the magnetic plate having projections arranged in the form of a lattice may otherwise be utilized as the stator and the mover of a pulse motor.

Furthermore, the surface pulse motor may be controlled such that two phases among the five or seven phases of the electromagnets may be operated simultaneously. Otherwise, a microstepping control or a closed-loop control with a predetermined phase sequence may be executed as in the case of a linear pulse motor.

The holding strength during X, Y movements and the like may be varied as desired by the construction of the projections of the stator and mover. By selecting a circular configuration for the projections, the holding strength may be made constant regardless of the direction of the relative movement.

Advantageous features of this invention are as follows.

(1) Although six phases have been required in the conventional example utilizing two three-phase variable reluctance linear pulse motors for X and Y directions, according to this invention, the phase number if reduced from six in the prior art to five.

(2) Although it is varied depending on the construction and number of the projections (or teeth), the holding strength is ordinarily larger than that of the linear pulse motor.

(3) Since it is not necessary to divide pulses into X and Y motors, the pulse distribution in the invention is much facilitated. Furthermore, since the direction of the movement is determined by the energized electromagnets, a logic circuit in a movement control device, for example can be simplified.

(4) The multiphase excitation of this invention increases freedom of the movement, while the resolution thereof is improved by a microstep operation.

What is claimed is:

1. A surface pulse motor having a stator and a mover, wherein
said stator comprises a magnetic material in a planar configuration, said stator having a number of projections spaced apart by a given pitch on a surface thereof at positions defining a rectangular lattice, said mover comprises five phase electromagnets of a densely wound type, said electromagnets have a number of projections spaced apart by said given pitch on a surface thereof opposing the surface of said stator, said projections of said mover define a rectangular coordinate lattice (X, Y) which is rotated relative to said rectangular lattice of said stator by an angle $\tan^{-1}(\frac{1}{2})$, said electromagnets of the second phase through the fifth phase are spaced apart from those of the first phase by a distance equal to $1/\sqrt{5}$ of the pitch of said rectangular lattice of said stator in the directions $+X$, $+Y$, $-X$ and $-Y$ of said coordinate lattice, respectively, and means are provided for supporting said mover such that an air gap is maintained between said stator and said mover and that said electromagnets are movable simultaneously in said X and Y directions.

2. A surface pulse motor having a stator and a mover, wherein said stator comprises a magnetic material in a planar configuration, said stator having a number of projections spaced apart by a given pitch on a surface thereof at positions defining a trinagular lattice, said mover comprises seven phase electromagnets of a densely wound type, said electromagnets have a number of projections formed on a surface opposing said surface of said stator said projections of said mover define a triangular coordinate lattice (X, Y, Z) which is rotated relative to said triangular lattice of said stator by an angle $\tan^{-1}(\sqrt{3}/5)$, said electromagnets of the second phase through the seventh phase are spaced apart from those of the first phase by a distance equal to $1\sqrt{7}$ of the pitch of said triangular lattice of said stator in the directions $+X$, $+Y$, $+Z$, $-X$, $-Y$ and $-Z$ of said coordinate lattice, respectively, and means are provided for supporting said mover such that an air gap is maintained between said stator and said mover, and that said electromagnets are movable simultaneously in said X, Y and Z directions.

* * * * *